United States Patent
Laroche et al.

(10) Patent No.: US 10,226,734 B2
(45) Date of Patent: Mar. 12, 2019

(54) HYBRID SOLVENT FORMULATIONS FOR SELECTIVE $H_2S$ REMOVAL

(71) Applicant: Dow Global Technologies LLC, Midland, MI (US)

(72) Inventors: Christophe R. Laroche, Lake Jackson, TX (US); Gerardo Padilla, Lake Jackson, TX (US); John R. Dowdle, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/032,765

(22) PCT Filed: Oct. 24, 2014

(86) PCT No.: PCT/US2014/062153
§ 371 (c)(1),
(2) Date: Apr. 28, 2016

(87) PCT Pub. No.: WO2015/065839
PCT Pub. Date: May 7, 2015

(65) Prior Publication Data
US 2016/0271558 A1  Sep. 22, 2016

Related U.S. Application Data

(60) Provisional application No. 61/897,678, filed on Oct. 30, 2013.

(51) Int. Cl.
*C10G 21/06* (2006.01)
*B01D 53/14* (2006.01)
*C10L 3/10* (2006.01)

(52) U.S. Cl.
CPC ..... *B01D 53/1493* (2013.01); *B01D 53/1468* (2013.01); *C10G 21/06* (2013.01);
(Continued)

(58) Field of Classification Search
None
See application file for complete search history.

(56) References Cited

U.S. PATENT DOCUMENTS 4,044,100 A  8/1977  McElroy et al.
4,085,192 A  4/1978  Van Scoy
(Continued)

FOREIGN PATENT DOCUMENTS

EP  0087208  8/1983
EP  0134948  3/1985
(Continued)

OTHER PUBLICATIONS

Bottoms, "Organic Amines—Girbotal Process", The Science of Petroleum, 1938, vol. 3, Oxford University Press (6 pages).

*Primary Examiner* — Daniel Berns
(74) *Attorney, Agent, or Firm* — Akerman LLP (57) ABSTRACT

A method of treating oil and gas streams including hydrogen sulfide ($H_2S$) comprising treating the gas stream with an aqueous solution of an amine and a physical solvent which, when mixed in equal mass ratio with the amine or amine mixture, display a dielectric constant of at least about 20, wherein the pKa of the amine is at least about 9.0 and the amine boiling point is at least 200° C.

14 Claims, 4 Drawing Sheets

(52) U.S. Cl.
CPC .......... *C10L 3/103* (2013.01); *B01D 2252/10* (2013.01); *B01D 2252/2023* (2013.01); *B01D 2252/2025* (2013.01); *B01D 2252/2056* (2013.01); *B01D 2252/20426* (2013.01); *B01D 2252/20431* (2013.01); *B01D 2252/20489* (2013.01); *B01D 2252/504* (2013.01); *B01D 2252/606* (2013.01); *B01D 2252/608* (2013.01); *B01D 2256/24* (2013.01); *B01D 2256/245* (2013.01); *B01D 2257/302* (2013.01); *B01D 2257/304* (2013.01); *B01D 2257/306* (2013.01); *B01D 2257/308* (2013.01); *C10L 2290/541* (2013.01)

(56) References Cited

U.S. PATENT DOCUMENTS

| | | | |
|---|---|---|---|
| 4,336,233 | A | 6/1982 | Appl et al. |
| 4,405,585 | A | 9/1983 | Sartori et al. |
| 4,484,934 | A | 11/1984 | Ferrin et al. |
| 4,545,965 | A | 10/1985 | Gazzi et al. |
| 4,892,674 | A | 1/1990 | Ho et al. |
| 4,997,630 | A | 3/1991 | Wagner et al. |
| 5,705,090 | A | 1/1998 | Garland et al. |
| 5,736,115 | A | 4/1998 | Iijima et al. |
| 6,337,059 | B1 | 1/2002 | Schubert et al. |
| 6,436,174 | B1 | 8/2002 | Grossmann et al. |
| 7,144,555 | B1* | 12/2006 | Squires ............... B01D 53/526 422/168 |
| 2010/0288125 | A1 | 11/2010 | Vorberg et al. |
| 2011/0262330 | A1 | 10/2011 | Hall et al. |
| 2012/0101184 | A1* | 4/2012 | Wang ................... C07D 233/58 522/167 |
| 2012/0216678 | A1* | 8/2012 | Geuzebroek ....... B01D 53/1456 95/187 |
| 2014/0290483 | A1 | 10/2014 | Delfort et al. |

FOREIGN PATENT DOCUMENTS

| | | |
|---|---|---|
| EP | 2283911 | 2/2011 |
| FR | 2982170 | 10/2013 |
| SU | 927282 | 5/1982 |
| WO | 1986/005474 | 9/1986 |
| WO | 2005/081778 | 9/2005 |
| WO | 2014/004019 | 1/2014 |
| WO | 2014/004020 | 1/2014 |
| WO | 2015/065839 | 5/2015 |
| WO | 2015/065842 | 5/2015 |

\* cited by examiner

HYBRID SOLVENT FORMULATIONS FOR SELECTIVE H₂S REMOVAL

CROSS-REFERENCE TO RELATED APPLICATIONS

This application is a national phase of PCT/US2014/062153, filed Oct. 24, 2014, which claims priority to U.S. Provisional Application No. 61/897,678, filed Oct. 30, 2013, the entire contents of both are hereby incorporated by reference.

FIELD OF THE INVENTION

The invention relates generally to solvents useful for the extraction of acidic gases from oil and gas well streams. More specifically the invention relates to solvent formulations and methods for the extraction of hydrogen sulfide gases.

BACKGROUND OF THE INVENTION

Fluid streams derived from natural gas reservoirs, petroleum or coal, often contain a significant amount of acid gases, for example carbon dioxide ($CO_2$), hydrogen sulfide ($H_2S$), sulfur dioxide ($SO_2$), carbon disulfide ($CS_2$), hydrogen cyanide (HCN), carbonyl sulfide (COS), or mercaptans as impurities. These fluid streams may be gas, hydrocarbon gases from shale pyrolysis, synthesis gas, and the like or liquids such as liquefied petroleum gas (LPG) and natural gas liquids (NGL).

Various compositions and processes for removal of acid gasses are known and described in the literature. It is well-known to treat gaseous mixtures with aqueous amine solutions to remove these acidic gases. Typically, the aqueous amine solution contacts the gaseous mixture comprising the acidic gases counter currently at low temperature or high pressure in an absorber tower. The aqueous amine solution commonly contains an alkanolamine such as triethanolamine (TEA), methyldiethanolamine (MDEA), diethanolamine (DEA), monoethanolamine (MEA), diisopropanolamine (DIPA), or 2-(2-aminoethoxy)ethanol (sometimes referred to as diglycolamine or DGA).

In some cases, an accelerator is used in combination with the alkanolamines, for example piperazine and MDEA as disclosed in U.S. Pat. Nos. 4,336,233; 4,997,630; and 6,337,059, all of which are incorporated by reference herein in their entirety. Alternatively, EP 0134948 discloses mixing an acid with select alkaline materials such as MDEA, to provide enhanced acid gas removal.

Tertiary amines, such as 3-dimethylamino-1, 2-propanediol (DMAPD), have been shown to be effective at removing $CO_2$ from gaseous mixtures, see U.S. Pat. No. 5,736,115. Further, in specific processes, e.g., the Girbotol Process, tertiary amines have been shown effective in removal of $H_2S$, but show decreased capacity at elevated temperatures, for examples see "Organic Amines-Girbotal Process", Bottoms, R. R., The Science of Petroleum, volume 3, Oxford University Press, 1938, pp 1810-1815.

Particularly important is the removal of sulfur based contaminants including hydrogen sulfide from fluid streams from oil and gas wells due to the highly noxious nature of these gases. Certain attempts at selective removal of sulfur based compounds have been made.

Tertiary alkanolamines such as MDEA are inherently selective for hydrogen sulfide over $CO_2$. Because of increasingly more stringent specifications towards hydrogen sulfide and sulfur dioxide emissions, there is a need for aqueous alkanolamine formulations capable of removing hydrogen sulfide selectively over $CO_2$ along with treating the gas to a very low level of $H_2S$ (i.e. 10 ppmv).

EP 01,134,948 discloses the use of low pKa acid additives (lower than 7) to enhance the selective removal of hydrogen sulfide. The technology aims at altering vapor liquid equilibrium characteristics of the alkanolamine solvent in order to achieve lower amount of hydrogen sulfide in the treated gas. U.S. Pat. No. 4,892,674 discloses the use of severely hindered alkanolamine salts as an additive for an MDEA gas treating solvent in order to enhance the selective removal of hydrogen sulfide over $CO_2$ compared to MDEA alone. This technology is a combination of the use of severely sterically hindered amine and low pKa acid additives to MDEA based solvents. US 2010/0288125 discloses the use of phosphonic acid additives in order to enhance hydrogen sulfide selective removal. The premise of this disclosure is that phosphonic acid additives are superior to known sulfuric and phosphoric acid additives.

The hydrogen sulfide selectivity achieved with aqueous tertiary alkanolamine solutions such as water and MDEA mixtures is limited by the hydrolysis reaction of carbon dioxide and water. It is therefore desirable to replace some or all of the water in such a mixture with a solvent that is not reactive towards $CO_2$. The premise of this adjustment is that hydrogen sulfide selectivity will increase by minimizing $CO_2$ hydrolysis.

U.S. Pat. No. 4,545,965 discloses a process using tertiary amines with organic solvents in substantially anhydrous (<2 wt % water) solutions for selective hydrogen sulfide removal. The hybrid mixtures disclosed demonstrate improved selectivity compared to aqueous alkanolamine solutions. This process relies on substantially low water concentrations (<2 wt %), solvent with low dielectric constant, and amines with low pKa's.

U.S. Pat. No. 4,085,192 discloses a process for removal of hydrogen sulfide using an aqueous mixtures of alkanolamine and sulfolane. The preferred amines are diisopropanolamine (DIPA) and methyldiethanolamine. This invention suffers from the limited selectivity of DIPA for $H_2S$ over $CO_2$ since DIPA is a secondary amine. Whereas, MDEA based hybrid formulations display low acid gas carrying capacity.

U.S. Pat. No. 4,405,585 discloses a process and formulation for selective hydrogen sulfide removal using aqueous blends of sterically hindered amines and physical solvent (preferred solvent is sulfolane). This process relies on sterically hindered amines having a low dielectric constant. In addition, the commercial usefulness of severely sterically hindered alkanolamine is somewhat limited by their difficult preparation as exemplified by patent publication WO 2005/081778 A2.

U.S. Pat. No. 5,705,090 discloses hybrid formulations for selective hydrogen sulfide removal using aqueous blends of polyethylene glycols and methyldiethanolamine. MDEA based hybrid formulations display low acid gas carrying capacity. In addition, polyethylene glycols display a rather low dielectric constant.

The Amisol process (Kohl & Nielsen, p 1231) uses aqueous blends of methanol and amines for selective hydrogen sulfide removal. The amines include diisopropylamine (DIPA) and diethylamine which display low vapor pressure and low dielectric constant as well as diethanolamine (DEA) which is not selective for $H_2S$ over $CO_2$.

WO 86/05474 discloses hybrid solvents for selective hydrogen sulfide removal. Amines include tertiary amines and sterically hindered amines. Physical solvents include glycols, glycol esters, glycol ethers, and N-methylpyrrolidone. These solutions are anhydrous (<5 wt % water).

Selectivity achieved with aqueous tertiary alkanolamine solutions such as water and MDEA mixtures is limited by the base catalyzed hydrolysis reaction of carbon dioxide and water. It is know that hydrogen sulfide selectivity may be improved by replacing some or all of the water in such a mixture with a physical solvent that does not react with carbon dioxide. While reducing water improves selectivity, it has also been shown to considerably diminish the capacity of the solvent for carrying acid gases. This limitation has prevented hybrid solvents from seeing widespread application in selective hydrogen sulfide applications. We anticipate that a hybrid solvent formulation that overcomes the capacity limitation will offer superior performance to aqueous tertiary alkanolamines.

While the above processed solutions are effective, they each have limitations which detract from selective extraction of sulfur gases.

Therefore, there is a need for formulations and processes incorporating a minimal amount of water and capable of carrying high concentration of acid gas at low to medium acid gas partial pressures.

SUMMARY OF THE INVENTION

A process is described for removal of sulfur gases from a gas mixture including hydrogen sulfide and carbon dioxide comprising contacting the mixture with a liquid absorbent composition including a tertiary or sterically hindered amine with a pKa of at least about 9.0 at 25° C., a physical solvent capable of providing a dielectric constant as much as 60 at 25° C. and of at least about 24 at 25° C. and preferably about 30 to about 45 at 25° C. when mixed in equal mass ratio with the amines of the invention. Equal mass ratio means that when an equal weight or mass of amine is mixed with an equal mass or weight of physical solvent the desired dielectric constant is obtained. Said amine preferably has a boiling point of at least 200° C.

Water is an important component in order to remove $CO_2$ from sour gas streams when using tertiary amine scrubbing solvent. With tertiary amines, no direct reaction takes place between the amine and $CO_2$ (see scheme below).

$$R_3N + H_2O + CO_2 \rightarrow HCO_3^- + R_3NH^+$$

With tertiary amines, at least one water molecule needs to be present in order to produce a protonated amine bicarbonate salt.

The capacity of a hybrid solvent of the invention for acid gases is a combination of the physical and chemical solubility of the gases in the solvent. For low to moderate pressure applications, the dominant contribution will come from the chemical solubility. Reaction products of acid gases with amines are ions which are better solvated in polar solvents. Therefore, increasingly favorable solvation free energy of the ionic products will allow for higher acid gas carrying capacity. We hypothesize that hybrid solvent mixture with higher polarity would display enhanced chemical solubility for acid gases. A useful indicator to evaluate the polarity for such formulations is the dielectric constant which will be a function of the polarities of the physical solvent and the amine.

Chemical solubility may be further enhanced by choosing an amine with a high pKa. In the interest of maintaining selectivity for hydrogen sulfide however, we restrict our choice to non-carbamate forming amines (tertiary amines and sterically hindered amines.).

DETAILED DESCRIPTION OF THE INVENTION

In accordance with the invention, there is provided a process for the selective extraction of hydrogen sulfide using an aqueous amine solution comprising an amine, a physical solvent and a balance of water. Preferably, the amine solution may also comprise an acid.

Generally, the process of the invention uses a solution of amine useful in extracting sulfur based gases such as hydrogen sulfide from the well stream.

Generally, alkanolamine solutions useful in the invention are those which do not directly react with carbon dioxide to form carbamates. These are generally tertiary amines and severely sterically hindered amines. Further, it is desired for the amine to have a dielectric constant of at least about 20 and a pKa of at least 9.0 at 25° C. It is also preferred that said amine has a boiling point of at least at 200° C. Amines such as 3-dimethylamino-1,2-propanediol (DMAPD), 3-diethylaminopropane-1,2-diol, 2-hydroxymethyl-2-dimethylaminopropane-1,3-diol (DMTA), or 2-hydroxymethyl-2-diethylaminopropane-1,3-diol (DETA) are examples of a tertiary amine meeting these criteria. In addition, 2-hydroxymethyl-2-methylamino-1,3-propanediol (MTA), and 2-ethylamino-2-hydroxymethyl-1,3-propanediol (ETA) are sterically hindered amines useful for this invention.

A physical solvent may also be present in the solution used in the process of the invention. The physical solvent minimizes the concentration of water and the associated reactions resulting from water. Preferred physical solvents include mono-functional and di-functional alcohols having a dielectric constant of at least 20 at 25° C., and of about 20 to about 80 at 25° C., preferably about 25 to about 70 at 25° C., more preferably about 30 to about 60 at 25° C. when measured as directed herein. Exemplary alcohols include methanol, glycerol, ethylene glycol, diethylene glycol, triethylene glycol, and mixtures thereof. Also useful as a physical solvent is sulfolane, N-methylpyrrolidone, N-formylmorpholine, propylene carbonate, ethylene carbonate alone or in combination with an alcohol.

An acid may also be present in the solution used in the process of the invention. The acids help to regenerate the solvent to low loadings and enhance the potency of the process. Preferred acids have a pKa lower than about 7 and include phosphoric acid, phosphorus acid, hydrochloric acid, sulfuric acid, sulfurous acid, boric acid, phosphonic acid, and the like.

Generally, the composition of the invention has a number of preferred constituents which affect the physical and chemical properties of the invention. Beyond the presence of an amine, it is preferred to maintain the concentration of water greater than 2 weight percent since anhydrous solutions have shown low acid gas carrying capacity. Further, it is desirable to have water in the solution so that vaporization of water may assist in removing acid gases from the solution in a solvent regeneration step.

It has also been found that using one or more constituents which maintain a sufficiently high dielectric constant is also preferable. Maintaining the dielectric properties of the composition has been found to enhance the efficacy of the composition by increasing the solvation free energy of the ions within the solution. We have found that the dielectric constant of the amine as well as the physical solvent both contribute to acid gas carrying capacity of the process of the invention. Generally, it has been found that this may be achieved if the dielectric constant of the amine blend is greater than 20 and if the dielectric constant of the physical solvent is greater than 25. In practice, the dielectric constant of the amines and physical solvents mixture in a one to one mass ratio needs to be at least 30 at 25° C. and preferably at least about 35 at 25° C.

Ultimately, the function of the composition of the invention is to strip or sweeten oil and gas streams. Removal of acidic constituents such as $H_2S$, $SO_2$, $CS_2$, COS, various mercaptans, and mixtures thereof is generally one of the function of the solution of the invention. Preferred functioning of the composition of the invention includes the removal of these acidic constituents in preference to carbon oxides such as CO and $CO_2$.

CONCENTRATION (mass %)

|  | General | Preferred | More Preferred |
|---|---|---|---|
| Amine | 15-60 | 20-50 | 30-50 |
| Physical Solvent | 5-60 | 10-50 | 20-40 |
| Water | 2-60 | 5-50 | 10-50 |

PHYSICAL PROPERTIES

|  | General | Preferred | More Preferred |
|---|---|---|---|
| Amine PkA | 9.0-15.0 | 9.0-13.0 | 9.0-11.0 |
| Dielectric constant[1] | 20-80 | 25-70 | 30-60 |

The ranges of dielectric constant[1] values were selected based on estimated values for a mixture of equal mass ratios of the amine and a physical solvent. The method used for estimation is discussed in Harvey and Prausnitz (1987). Examples for mixtures meeting and not meeting our dielectric constant criteria are shown in the table below for equal mass ratio mixtures of representative amines and physical solvents.

[1] The dielectric constant specified is for the equal mass ratio mixture of amine and physical solvent.

| Example | Mixture Composition | | Estimated Permittivity |
|---|---|---|---|
| 1 | MDEA | Ethylene glycol | 30.7 |
| 2 | MDEA | Diethylene glycol | 26.8 |
| 3 | MDEA | Triethylene glycol | 23.0 |
| 4 | MDEA | Methoxytriglycol | 17.5 |
| 5 | MDEA | Ethyoxytriglycol | 16.9 |
| 6 | MDEA | Butoxytriglycol | 15.7 |
| 5 | MDEA | Glycerol | 30.6 |
| 6 | MDEA | Sulfolane | 31.5 |
| 7 | MDEA | Propylene Carbonate (PC) | 41.5 |
| 8 | MDEA | Ethylene Carbonate (EC) | 52.8 |
| 9 | MDEA | N-methyl-2-pyrrolidone (NMP) | 27.0 |
| 10 | Dimethylethanolamine | Ethylene glycol | 27.2 |
| 11 | Dimethylethanolamine | Diethylene glycol | 23.6 |
| 12 | Dimethylethanolamine | Triethylene glycol | 20.1 |
| 13 | Dimethylethanolamine | Methoxytriglycol | 15.2 |
| 14 | Dimethylethanolamine | Ethyoxytriglycol | 14.6 |
| 15 | Dimethylethanolamine | Butoxytriglycol | 13.5 |
| 16 | Dimethylethanolamine | Glycerol | 26.9 |
| 17 | Dimethylethanolamine | Sulfolane | 27.8 |
| 18 | Dimethylethanolamine | Propylene Carbonate (PC) | 37.0 |
| 19 | Dimethylethanolamine | Ethylene Carbonate | 47.2 |
| 20 | Dimethylethanolamine | N-methyl-2-pyrrolidone (NMP) | 24.0 |
| 21 | Triethanolamine | Ethylene glycol | 34.1 |
| 22 | Triethanolamine | Diethylene glycol | 30.0 |
| 23 | Triethanolamine | Triethylene glycol | 26.0 |
| 24 | Triethanolamine | Methoxytriglycol | 20.2 |
| 25 | Triethanolamine | Ethyoxytriglycol | 19.5 |
| 26 | Triethanolamine | Butoxytriglycol | 18.2 |
| 27 | Triethanolamine | Glycerol | 34.1 |
| 28 | Triethanolamine | Sulfolane | 35.1 |
| 29 | Triethanolamine | Propylene Carbonate (PC) | 45.4 |
| 30 | Triethanolamine | Ethylene Carbonate (EC) | 57.5 |
| 31 | Triethanolamine | N-methyl-2-pyrrolidone (NMP) | 30.1 |

From the table it can be seen that the amine as well as the physical solvent dielectric constant are important for meeting the criteria. For example, mixture 2 has a dielectric constant in the preferred range, whereas mixture 11, which has the same physical solvent, but a less polar amine, does not.

Processing

The process of the present invention is preferably used to remove $H_2S$ and $CO_2$ from a gas stream comprising $H_2S$ and $CO_2$ optionally in the presence of one or more other acid gas impurities, for example $N_2$, $CH_4$, $C_2H6$, $C_3H_8$, $H_2$, CO, $H_2O$, COS, HCN, $NH_3$, $O_2$, and/or mercaptans. Further, the present invention may be used to remove $H_2S$, $CO_2$ and one or more of $N_2$, $CH_4$, $C_2H_6$, $C_3H_8$, $H_2$, CO, $H_2O$, COS, HCN, $NH_3$, $O_2$, and/or mercaptans from a gas stream comprising $H_2S$, $CO_2$ and one or more of $SO_2$, $CS_2$, HCN, COS, and/or mercaptans.

The absorption step of this invention generally involves contacting the fluid stream, preferably gaseous mixture, with the aqueous alkanolamine solution in any suitable contacting vessel, for examples of representative absorption processes see U.S. Pat. Nos. 5,736,115 and 6,337,059 both of which are incorporated herein by reference in their entirety. In such processes, the fluid stream containing $H_2S$ and/or other impurities from which the acid gasses are to be removed may be brought into intimate contact with the aqueous alkanolamine solution using conventional means, such as a tower or vessel packed with, for example, rings or with sieve plates, or a bubble reactor.

In a typical mode of practicing the invention, the absorption step is conducted by feeding the fluid stream into the lower portion of the absorption tower while fresh aqueous alkanolamine solution is fed into the upper region of the tower. The fluid stream, freed largely from the $H_2S$ and $CO_2$ if present emerges from the upper portion (sometimes referred to as treated or cleaned gas) of the tower, and the loaded aqueous alkanolamine solution, which contains the absorbed $H_2S$ and $CO_2$, leaves the tower near or at its bottom. Preferably, the inlet temperature of the absorbent composition during the absorption step is in the range of from 60° F. to 300° F., and more preferably from 80° F. to 250° F. Pressures may vary widely; acceptable pressures are between 1 and 5,000 pounds per square inch (psi), preferably 2 to 2,500 psi, and most preferably 5 to 2,000 psi in the absorber. The contacting takes place under conditions such that the $H_2S$ is preferably absorbed by the solution. The absorption conditions and apparatus are designed so as to minimize the residence time of the aqueous alkanolamine solution in the absorber to reduce $CO_2$ pickup while at the same time maintaining sufficient residence time of the fluid stream with the aqueous absorbent composition to absorb a maximum amount of the $H_2S$ gas. Fluid streams with low partial pressures, such as those encountered in thermal conversion processes, will require less of the aqueous alkanolamine solution under the same absorption conditions than fluid streams with higher partial pressures such as shale oil retort gases.

A typical procedure for the $H_2S$ removal phase of the process comprises absorbing $H_2S$ via countercurrent contact of a gaseous mixture containing $H_2S$ and $CO_2$ with the aqueous alkanolamine solution of the amino compound in a column containing a plurality of trays at a temperature, of at least 60° F., and at a gas velocity of at least 0.3 feet per second (ft/sec, based on "active" or aerated tray surface), depending on the operating pressure of the gas, said tray column having fewer than 20 contacting trays, with, e.g., 4 to 16 trays being typically employed.

After contacting the fluid stream with the aqueous alkanolamine solution, which becomes saturated or partially saturated with $H_2S$, the solution may be at least partially regenerated so that it may be recycled back to the absorber. As with absorption, the regeneration may take place in a single liquid phase. Regeneration or desorption of the acid gases from the aqueous alkanolamine solution may be accomplished by conventional means of heating, expansion, stripping with an inert fluid, or combinations thereof, for example pressure reduction of the solution or increase of temperature to a point at which the absorbed $H_2S$ flashes off, or by passing the solution into a vessel of similar construction to that used in the absorption step, at the upper portion of the vessel, and passing an inert gas such as air or nitrogen or preferably steam upwardly through the vessel. The temperature of the solution during the regeneration step should be in the range from 120° F. to 400° F. and preferably from 140° F. to 300° F., and the pressure of the solution on regeneration should range from 0.5 psi to 100 psi, preferably 1 psi to 50 psi. The aqueous alkanolamine solution, after being cleansed of at least a portion of the $H_2S$ gas, may be recycled back to the absorbing vessel. Makeup absorbent may be added as needed.

In a preferred regeneration technique, the $H_2S$-rich aqueous alkanolamine solution is sent to the regenerator wherein the absorbed components are stripped by the steam which is generated by boiling the solution. Pressure in the flash drum and stripper is usually 1 psi to 50 psi, preferably 5 psi to 30 psi, and the temperature is typically in the range from 120° F. to 340° F., preferably 170° F. to 300° F. Stripper and flash temperatures will, of course, depend on stripper pressure; thus at 15 psi to 30 psi stripper pressures, the temperature will be 170° F. to 250° F. during desorption. Heating of the solution to be regenerated may very suitably be affected by means of indirect heating with low-pressure steam. It is also possible, however, to use direct injection of steam. The resulting hydrogen sulfide-lean aqueous alkanolamine solution may be used to contact a gaseous mixture containing $H_2S$.

Preferably the clean gas contains equal to or less than 10 ppm $H_2S$ meeting some environmental regulations, more preferably equal to or less than 4 ppm $H_2S$, meeting typical pipeline specifications.

A preferred embodiment of the present invention involves performing the method of the present invention continuously, or as a continuous process. However, the method may be performed batch wise or semi-conditions, equipment used, type and amount of gaseous stream, and other factors apparent to one of ordinary skill in the art based on the disclosure herein.

Figure 1:
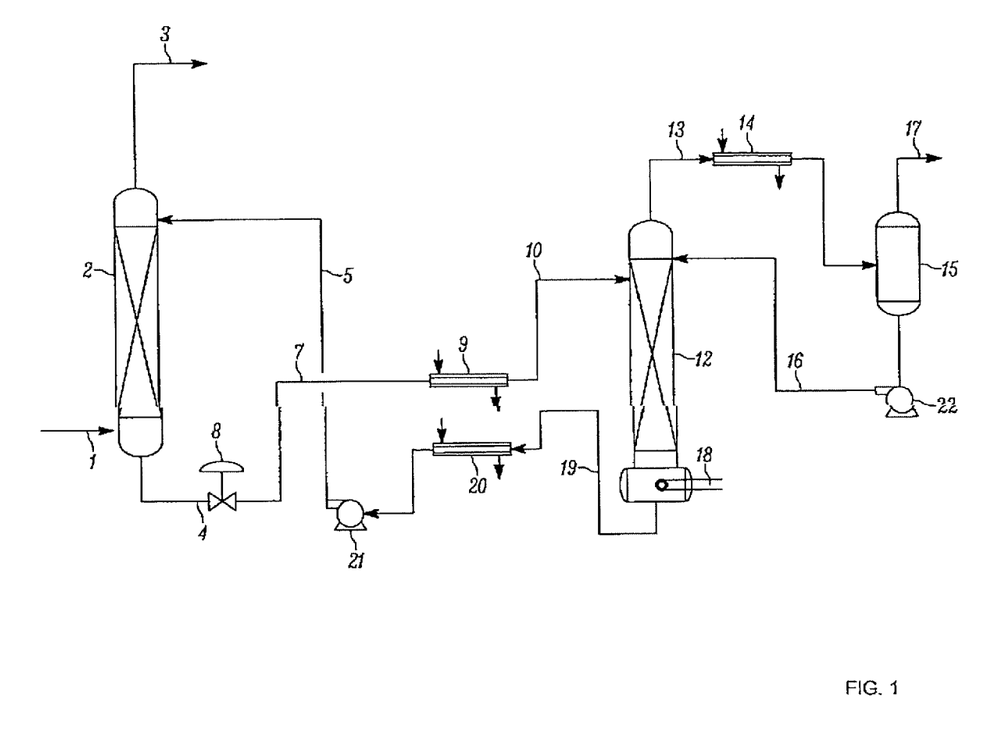
FIG. 1 illustrates a process flow diagram of an absorption process according the present invention.

FIG. 1 represents an example of a gas treating process. An aqueous amine absorbent solution is introduced via feed line 5 into the upper portion of a gas-liquid countercurrent packed-bed absorption column 2. The gas stream is introduced through feed line 1 into the lower portion of column 2 at a gas flow rate of 10 liter per minute. The absorber pressure is adjusted to 238 psia. The clean gas (i.e., reduced amounts of $H_2S$ and $CO_2$) is discharged at the top of the absorber 2 through line 3 levels of acid gases are determined by gas chromatography (GC) analysis. The aqueous amine solution loaded with $H_2S$ and $CO_2$ flows toward the lower portion of the absorber, and leaves via line 4. The aqueous amine in line 4 is reduced in pressure by the level control valve 8 and flows through line 7 to heat exchanger 9, which heats the loaded aqueous solution. The hot rich solution enters the upper portion of the regenerator 12 via line 10. The regenerator 12 is equipped with random packing which effects desorption of the $H_2S$ and $CO_2$ gases. The pressure of the regenerator is set at 17 psia. The gases are passed through line 13 into condenser 14 wherein cooling and condensation of any residual water and amine occurs. The gases enter a separator 15 wherein the condensed liquid is separated from the vapor phase. The condensed aqueous solution is pumped via pump 22 through line 16 to the upper portion of the regenerator 12. The gases remaining from the condensation are removed through line 17 for final collection and/or disposal. The regenerated aqueous solution flows down through the regenerator 12 and the close-coupled reboiler 18. The reboiler 18, equipped with an electrical heating device, vaporizes a portion of the aqueous solution to drive off any residual gases. The vapors rise from the reboiler and are returned to the regenerator 12 which comingle with falling liquid and then exit through line 13 for entry into the condensation stage of the process. The regenerated aqueous solution from the reboiler 18 leaves through line 19 and is cooled in heat exchanger 20, and then is pumped via pump 21 back into absorber 2 through feed line 5.

WORKING EXAMPLES

The following Examples represent non-limiting illustrations of various embodiments of the invention.

Medium Pressure Pilot Plant Data

Solutions made of Water, MDEA and Ethylene Glycol (EG) are screened for $H_2S$ selectivity in a medium pressure pilot plant.

An aqueous amine absorbent solution is introduced into the pilot scale absorber FIG. 1 via feed line 5 into the upper portion of a gas-liquid countercurrent packed-bed absorption column 2. The gas stream is introduced through feed line 1 into the lower portion of column 2 at a gas flow rate of 10 liter per minute. The absorber pressure is adjusted to 232 psia. The clean gas (i.e., reduced amounts of $H_2S$ and $CO_2$) is discharged at the top of the absorber 2 through line 3 and residual $H_2S$ and $CO_2$ levels are determined by gas chromatography (GC) analysis. The aqueous amine solution loaded with $H_2S$ and $CO_2$ flows toward the lower portion of the absorber, and leaves via line 4.

| Product | MDEA/H2O 50/50 | MDEA/EG/H2O 50/45/5 |
|---|---|---|
| Solution Flow Rate | 10 ml/min. | 10 ml/min. |
| Solution Gas Feed Rate | 10 liters/min. | 10 liters/min. |
| Feed Gas Analysis | | |
| CO2-vol. % | 10.9 | 10.9 |
| H2S-% | 1.6 | 1.6 |
| Outlet Gas Analysis | | |
| CO2-% | 5.01 | 7.59 |
| H2S-% | 0.38 | 0.54 |
| Rich Solution Loading (mole/mole | | |
| CO2 | 0.4581 | 0.2730 |
| H2S | 0.1282 | 0.1354 |
| Absorber | | |
| Pressure, psia. | 232 | 232 |

These results indicate that even though ethylene glycol (EG) has the potential to react with $CO_2$ and to form alkylcarbonic acid in a relative manner that water forms bicarbonate, the absorption rate of $CO_2$ is greatly reduced by the replacement of water by EG.

VLE Acquired by Headspace Analysis of Glycol-Amine Mixtures.

Figure 2:
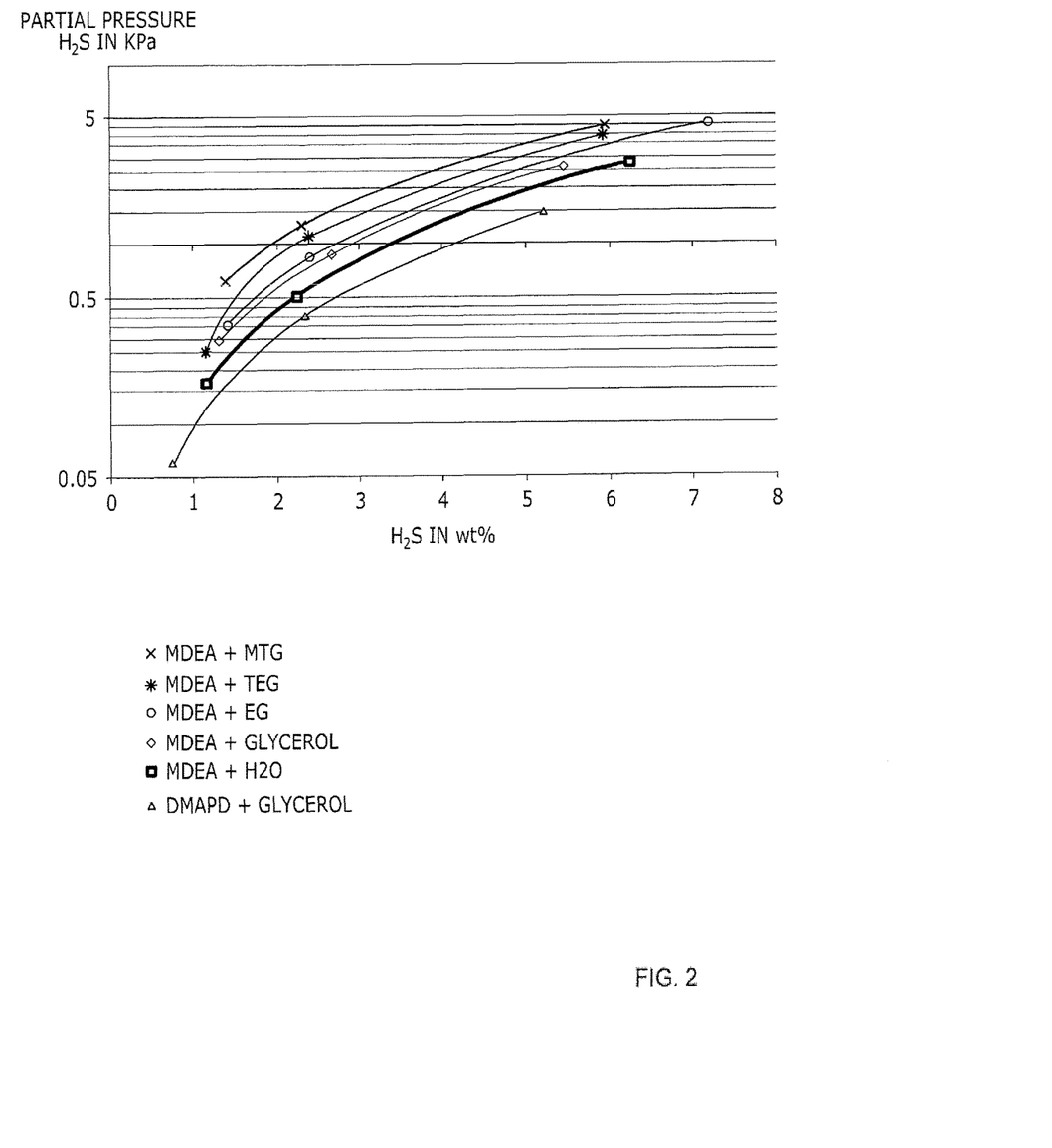
FIG. 2 is a graph depicting VLE acquired by Headspace Analysis of Glycol-Amine Mixtures.

Solution containing 50 wt % of amine, 25 wt % of water and 25 wt % of a physical solvent are loaded with about 1, 2.5 and 5 wt % of $H_2S$ and then studied by headspace analysis at 50° C. and 20 psig. The results are set forth in FIG. 2.

The dielectric constant of physical solvents can be used as an indication for their polarity.

| Physical Solvent | MTG | TEG | EG | Glycerol | Water |
|---|---|---|---|---|---|
| Dielectric Constant | 13 | 24 | 40 | 41 | 78 |

The results are showing that, as the polarity of the molecule replacing water increase (MTG<TEG<EG<Glycerol), the capacity of the formulation for acid gases increases.

Selectivity of $H_2S$ Over $CO_2$ Acquired by Headspace Analysis.

Solution containing 50 wt % of amine, from 25 wt % to 50 wt % of water and from 0 to 25 wt % of a physical solvent are loaded with about 0.5 mol/mol of an acid gas mixture containing various ratio of $H_2S$ and $CO_2$ and then studied by headspace analysis at 40° C. and 20 psig.

| MDEA/Water (50/50) | | | |
|---|---|---|---|
| $H_2S$ (mol/mol) in the liquid | $CO_2$ (mol/mol) in the liquid | $H_2S$ in Headspace (%) | $CO_2$ in Headspace (%) |
| 0.11 | 0.43 | 4.15 | 16.22 |
| 0.22 | 0.33 | 8.93 | 13.79 |
| 0.33 | 0.22 | 14.62 | 10.34 |
| 0.43 | 0.11 | 17.72 | 5.88 |

| DMAPD/Water (50/50) | | | |
|---|---|---|---|
| $H_2S$ (mol/mol) in the liquid | $CO_2$ (mol/mol) in the liquid | $H_2S$ in Headspace (%) | $CO_2$ in Headspace (%) |
| 0.11 | 0.45 | 2.32 | 12.35 |
| 0.22 | 0.33 | 4.76 | 9.21 |
| 0.33 | 0.22 | 6.81 | 6.16 |
| 0.43 | 0.11 | 9.62 | 3.42 |

| DMAPD/EG//Water (50/25/50) | | | |
|---|---|---|---|
| $H_2S$ (mol/mol) in the liquid | $CO_2$ (mol/mol) in the liquid | $H_2S$ in Headspace (%) | $CO_2$ in Headspace (%) |
| 0.10 | 0.41 | 3.45 | 31.56 |
| 0.20 | 0.31 | 6.83 | 23.37 |
| 0.30 | 0.20 | 11.78 | 17.05 |
| 0.40 | 0.10 | 15.04 | 8.19 |

| DEAPD/Water (50/50) | | | |
|---|---|---|---|
| $H_2S$ (mol/mol) in the liquid | $CO_2$ (mol/mol) in the liquid | $H_2S$ in Headspace (%) | $CO_2$ in Headspace (%) |
| 0.10 | 0.40 | 1.05 | 5.91 |
| 0.20 | 0.30 | 2.11 | 4.51 |
| 0.30 | 0.20 | 3.15 | 3.06 |
| 0.40 | 0.10 | 4.09 | 1.58 |

| DEA/Water (50/50) | | | |
|---|---|---|---|
| $H_2S$ (mol/mol) in the liquid | $CO_2$ (mol/mol) in the liquid | $H_2S$ in Headspace (%) | $CO_2$ in Headspace (%) |
| 0.10 | 0.40 | 5.29 | 4.80 |
| 0.21 | 0.30 | 8.97 | 2.45 |
| 0.31 | 0.20 | 11.35 | 1.18 |
| 0.41 | 0.10 | 13.02 | 0.45 |

One characteristic of ultimate importance for the formulation is the selectivity for $H_2S$ over $CO_2$. This selectivity can be defined by the mole fraction below:

$$\frac{\text{(moles of H2S/moles of CO2) in liquid phase}}{\text{(moles of H2S/moles of CO2) in gaseous phase}}$$

| Example | | Ratio in the liquid | Ratio in the gas | selectivity |
|---|---|---|---|---|
| 1 | MDEA | 0.27 | 0.26 | 1.04 |
| 2 | | 0.66 | 0.65 | 1.02 |
| 3 | | 1.49 | 1.41 | 1.06 |

-continued

| Example | | Ratio in the liquid | Ratio in the gas | selectivity |
|---|---|---|---|---|
| 4 | | 3.84 | 3.02 | 1.27 |
| 5 | DMAPD | 0.25 | 0.19 | 1.32 |
| 6 | | 0.67 | 0.52 | 1.29 |
| 7 | | 1.50 | 1.11 | 1.35 |
| 8 | | 3.92 | 2.81 | 1.40 |
| 9 | DEAPD | 0.25 | 0.18 | 1.42 |
| 10 | | 0.68 | 0.47 | 1.44 |
| 11 | | 1.52 | 1.03 | 1.47 |
| 12 | | 3.93 | 2.59 | 1.51 |
| 13 | DMAPD/EG | 0.24 | 0.11 | 2.19 |
| 14 | | 0.64 | 0.29 | 2.19 |
| 15 | | 1.50 | 0.69 | 2.17 |
| 16 | | 3.92 | 1.84 | 2.13 |
| 17 | DEA | 0.25 | 1.10 | 0.23 |
| 18 | | 0.68 | 3.66 | 0.19 |
| 19 | | 1.54 | 9.62 | 0.16 |
| 20 | | 4.08 | 28.95 | 0.14 |

The results are showing that an aqueous solution of DEAPD (examples 9-12) exhibits superior selectivity compared to DMAPD (examples 5-8) followed by MDEA (examples 1-4) and DEA (examples 17-20). The results are also showing that the partial replacement of water by ethylene glycol (EG) (examples 13-16) allows for the best selectivity.

Medium Pressure Pilot Plant Data at Low Pressure.

Solution made of MDEA, DMAPD (3-dimethylaminopropane-1, 2-diol) and water (35/5/60) acidified with 1 wt % $H_3PO_4$ (solution A) is compared with a mixture containing DMAPD, water and glycerol (40/20/40) acidified with 1 wt % $H_3PO_4$ (solution B) in a medium pressure pilot plant at 5 psig. The results are set forth in FIG. 2. A gas stream comprising a synthetic mixture containing 4.0 percent $H_2S$, 10.0 percent $CO_2$ and 76.0 percent $N_2$, wherein percent is percent by volume, is treated in a pilot scale absorber to remove the $H_2S$ and $CO_2$. For each aqueous amine absorbent solution, the gas stream is treated at three different flow rates. The compositions, process parameters, and residual $H_2S$ and $CO_2$ levels for Examples 1 to 5 are listed in Table 1.

"MDEA" is 98% methyldiethanolamine available from The Dow Chemical Company;

"DMAPD" is 98% 3-dimethylamino-1, 2-propanediol available from AK scientific;

"Glycerol" is 98% 1, 2, 3-propanetriol available from Fisher Scientific; and

"$H_3PO_4$" is an 85% o-phosphoric acid available from Fisher Scientific.

An aqueous amine absorbent solution is introduced into the pilot scale absorber FIG. 1 via feed line 5 into the upper portion of a gas-liquid countercurrent packed-bed absorption column 2. The gas stream is introduced through feed line 1 into the lower portion of column 2 at a gas flow rate of 10 liter per minute. The absorber pressure is adjusted to 20 psia. The clean gas (i.e., reduced amounts of $H_2S$ and $CO_2$) is discharged at the top of the absorber 2 through line 3 and residual $H_2S$ and $CO_2$ levels are determined by gas chromatography (GC) analysis. The aqueous amine solution loaded with $H_2S$ and $CO_2$ flows toward the lower portion of the absorber, and leaves via line 4.

The aqueous amine in line 4 is reduced in pressure by the level control valve 8 and flows through line 7 to heat exchanger 9, which heats the loaded aqueous solution. The hot rich solution enters the upper portion of the regenerator 12 via line 10. The regenerator 12 is equipped with random packing which effects desorption of the $H_2S$ and $CO_2$ gases. The pressure of the regenerator is set at 17 psia. The gases are passed through line 13 into condenser 14 wherein cooling and condensation of any residual water and amine occurs. The gases enter a separator 15 wherein the condensed liquid is separated from the vapor phase. The condensed aqueous solution is pumped via pump 22 through line 16 to the upper portion of the regenerator 12. The gases remaining from the condensation are removed through line 17 for final collection and/or disposal. The regenerated aqueous solution flows down through the regenerator 12 and the close-coupled reboiler 18. The reboiler 18, equipped with an electrical heating device, vaporizes a portion of the aqueous solution to drive off any residual gases. The vapors rise from the reboiler and are returned to the regenerator 12 which comingle with falling liquid and then exit through line 13 for entry into the condensation stage of the process. The regenerated aqueous solution from the reboiler 18 leaves through line 19 and is cooled in heat exchanger 20, and then is pumped via pump 21 back into absorber 2 through feed line 5.

The flow rate for the aqueous amine absorbent is determined by slowly adjusting downward until the amount of $H_2S$ in the purified gas line 3 shows a dramatic increase.

Table 1

| Example | 1* | 2* | 3 | 4 | 5 |
|---|---|---|---|---|---|
| Absorbant Composition | | | | | |
| MDEA | 35 | 35 | | | |
| DMAPD | 5 | 5 | 40 | 40 | 40 |
| Glycerol | | | 40 | 40 | 40 |
| $H_3PO_4$ | 1 | 1 | 1 | 1 | 1 |
| Water | 60 | 60 | 20 | 20 | 20 |
| Absorbent Flow Rate, cc/min | 20.5 | 42.3 | 19.9 | 29.8 | 39.8 |
| Outlet Gas GC Analysis | | | | | |
| $CO_2$, % | 7.34 | 6.1 | 8.1 | 7.55 | 7.36 |
| $H_2S$, ppmv | 158 | 20 | 126 | 50 | 35 |
| Rich Solution Loading (mol/mol) | | | | | |
| $CO_2$ | 0.09591 | 0.06505 | 0.06042 | 0.04976 | 0.03956 |
| $H_2S$ | 0.12031 | 0.05992 | 0.09926 | 0.06668 | 0.05020 |
| $CO_2$ Slip (%) | 73 | 61 | 81 | 76 | 74 |

Figure 3:
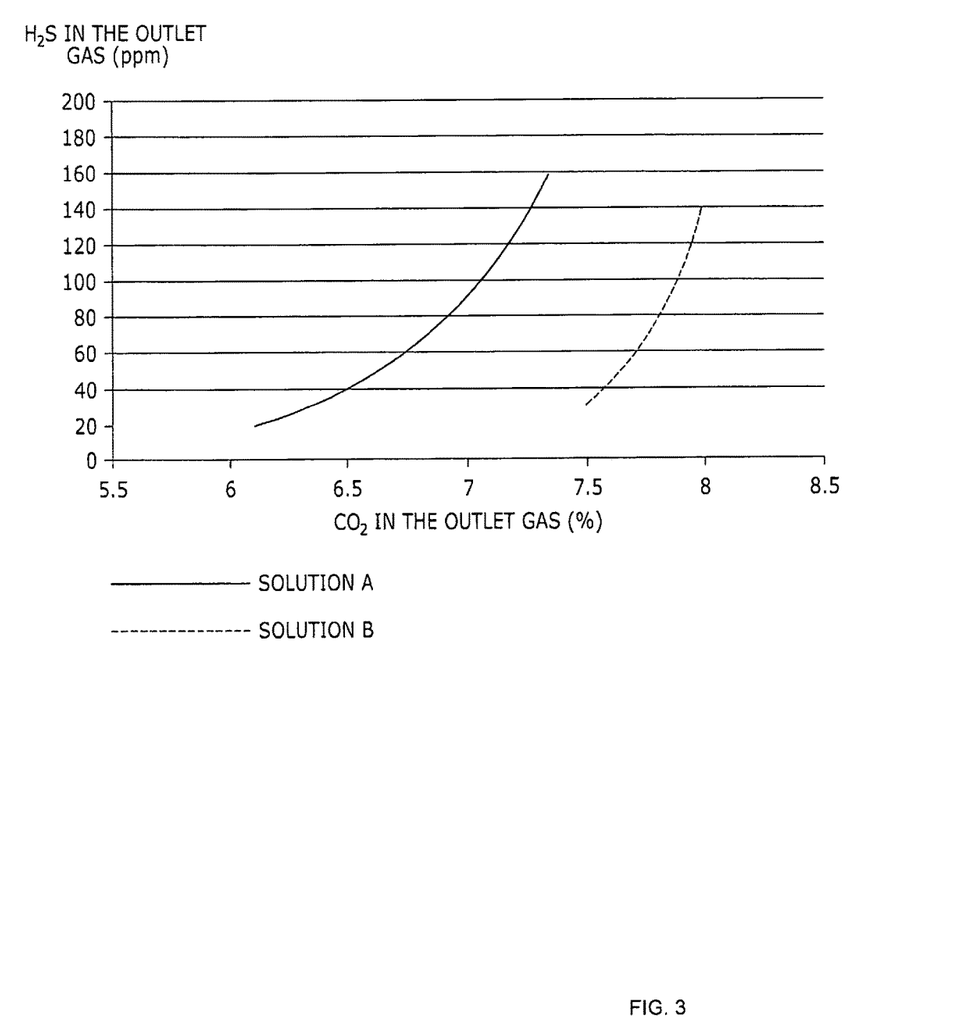
FIG. 3 is a graph depicting $H_2S$ versus $CO_2$ contained in treated gas at low pressure.

Hybrid formulation proved to be superior to the aqueous formulation in terms of selectivity as can be seen when plotting the amount of $H_2S$ versus the amount of $CO_2$ contained in the treated gas, as shown in FIG. 3.

Medium Pressure Pilot Plant Data at High Pressure.

Solutions made of MDEA or DMAPD (3-dimethylaminopropane-1,2-diol) and water acidified with 1 wt % $H_3PO_4$ are compared with mixtures containing DMAPD, water and a physical solvent (50/25/25) acidified with 1 wt % $H_3PO_4$ in a medium pressure pilot plant at 235 psig. A gas stream comprising a synthetic mixture containing 4.2 percent $H_2S$, 16.0 percent $CO_2$ and 79.8 percent $N_2$, wherein percent is percent by volume, is treated in a pilot scale absorber to remove the $H_2S$ and $CO_2$. For each aqueous amine absorbent solution, the gas stream is treated at three different flow rates. The compositions, process parameters, and residual $H_2S$ and $CO_2$ levels for Examples 1 to 12 are listed in Table 2.

"MDEA" is 98% methyldiethanolamine available from The Dow Chemical Company;

"DMAPD" is 98% 3-dimethylamino-1,2-propanediol available from AK scientific;

"Glycerol" is 98% 1,2,3-propanetriol available from Fisher Scientific;

"EG" is 98% ethylene glycol available from The Dow Chemical Company; and

"$H_3PO_4$" is an 85% o-phosphoric acid available from Fisher Scientific.

An aqueous amine absorbent solution is introduced into the pilot scale absorber FIG. 1 via feed line 5 into the upper portion of a gas-liquid countercurrent packed-bed absorption column 2. The gas stream is introduced through feed line 1 into the lower portion of column 2 at a gas flow rate of 10 liter per minute. The absorber pressure is adjusted to 250 psia. The clean gas (i.e., reduced amounts of $H_2S$ and $CO_2$) is discharged at the top of the absorber 2 through line 3 and residual $H_2S$ and $CO_2$ levels are determined by gas chromatography (GC) analysis. The aqueous amine solution loaded with $H_2S$ and $CO_2$ flows toward the lower portion of the absorber, and leaves via line 4.

The aqueous amine in line 4 is reduced in pressure by the level control valve 8 and flows through line 7 to heat exchanger 9, which heats the loaded aqueous solution. The hot rich solution enters the upper portion of the regenerator 12 via line 10. The regenerator 12 is equipped with random packing which effects desorption of the $H_2S$ and $CO_2$ gases. The pressure of the regenerator is set at 17 psia. The gases are passed through line 13 into condenser 14 wherein cooling and condensation of any residual water and amine occurs. The gases enter a separator 15 wherein the condensed liquid is separated from the vapor phase. The condensed aqueous solution is pumped via pump 22 through line 16 to the upper portion of the regenerator 12. The gases remaining from the condensation are removed through line 17 for final collection and/or disposal. The regenerated aqueous solution flows down through the regenerator 12 and the close-coupled reboiler 18. The reboiler 18, equipped with an electrical heating device, vaporizes a portion of the aqueous solution to drive off any residual gases. The vapors rise from the reboiler and are returned to the regenerator 12 which comingle with falling liquid and then exit through line 13 for entry into the condensation stage of the process. The regenerated aqueous solution from the reboiler 18 leaves through line 19 and is cooled in heat exchanger 20, and then is pumped via pump 21 back into absorber 2 through feed line 5.

The flow rate for the aqueous amine absorbent is determined by slowly adjusting downward until the amount of $H_2S$ in the purified gas line 3 shows a dramatic increase.

Table 2

| Example | 1* | 2* | 3* | 4* | 5* | 6* |
|---|---|---|---|---|---|---|
| Absorbant Composition | | | | | | |
| DMAPD | 50 | 50 | 50 | | | |
| MDEA | | | | 50 | 50 | 50 | 50 |
| Glycerol | | | | | | |
| EG | | | | | | |

-continued

| $H_3PO_4$ | 1 | 1 | 1 | 1 | 1 | 1 |
|---|---|---|---|---|---|---|
| Water | 50 | 50 | 50 | 50 | 50 | 50 |
| Absorbent Flow Rate, cc/min | 17.5 | 22.3 | 24.9 | 21.4 | 24.9 | 36.4 |
| Outlet Gas GC Analysis | | | | | | |
| $CO_2$, % | 9.8 | 8.5 | 7.2 | 9.2 | 8.0 | 4.6 |
| $H_2S$, ppmv | 410 | 44 | 21.4 | 370 | 71 | 8 |
| $CO_2$ Slip (%) | 61 | 53 | 45 | 58 | 50 | 29 |

| Example | 7 | 8 | 9 | 10 | 11 | 12 |
|---|---|---|---|---|---|---|
| Absorbant Composition | | | | | | |
| DMAPD | 50 | 50 | 50 | | | |
| MDEA | | | 50 | 50 | 50 | 50 |
| Glycerol | 25 | 25 | 25 | | | |
| EG | | | | 25 | 25 | 25 |
| $H_3PO_4$ | 1 | 1 | 1 | 1 | 1 | 1 |
| Water | 25 | 25 | 25 | 25 | 25 | 25 |
| Absorbent Flow Rate, cc/min | 25.9 | 31.2 | 43.2 | 30.3 | 40.5 | 45.8 |
| Outlet Gas GC Analysis | | | | | | |
| $CO_2$, % | 11.7 | 9.4 | 6.7 | 10.1 | 8.7 | 7.5 |
| $H_2S$, ppmv | 338 | 21.5 | 1.6 | 80 | 17 | 5 |
| $CO_2$ Slip (%) | 73 | 59 | 42 | 63 | 54 | 47 |

Figure 4:
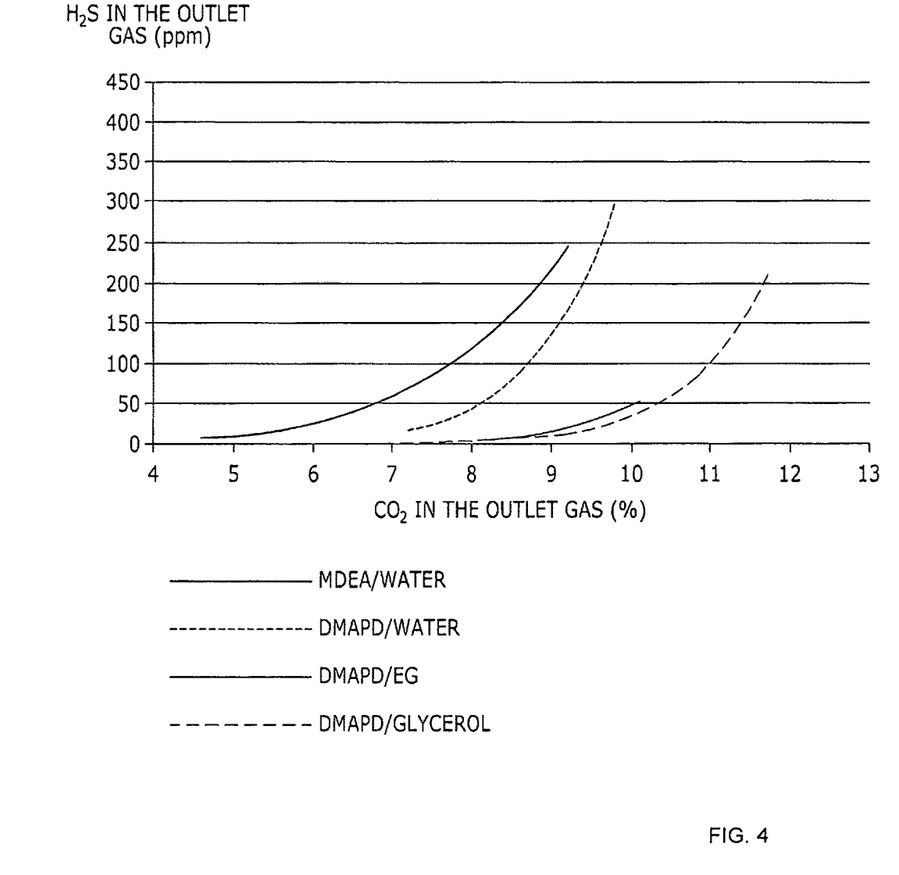
FIG. 4 is a graph depicting $H_2S$ versus $CO_2$ contained in treated gas at high pressure.

Formulation where water has been partially substituted by a physical solvent proved to exhibit superior selectivity compared to aqueous formulations. This could be seen visually by plotting the amount of $H_2S$ versus the amount of $CO_2$ contained in the treated gas as shown in FIG. 4.

Although the present invention has been described by reference to its preferred embodiment as is disclosed in the specification and drawings above, many more embodiments of the present invention are possible without departing from the invention. Thus, the scope of the invention should be limited only by the impended claims.

The claimed invention is:

1. A method of treating oil and gas streams comprising hydrogen sulfide ($H_2S$) and other acid gases, said method comprising:
    treating said oil and gas streams with an aqueous solution, said aqueous solution comprising:
    an amine selected from the group consisting of 2-hydroxymethyl-2-dimethylaminopropane-1,3-diol (DMTA), 2-hydroxymethyl-2-diethylaminopropane-1,3-diol (DETA), 2-hydroxymethyl-2-methylaminopropane-1,3-diol (MTA); 2-ethylamino-2-hydroxymethyl-1,3-propanediol (ETA); and mixtures thereof; and
    a physical solvent;
    wherein said aqueous solution selectively removes said $H_2S$ over said other acid gases.

2. The method of claim 1, wherein said physical solvent is present at a concentration from about 5 wt % to 60 wt %.

3. The method of claims 1 or 2, wherein said physical solvent is selected from the group of glycerol, ethylene glycol, sulfolane, N-methylpyrrolidone, N-formylmorpholine, propylene carbonate, ethylene carbonate and mixtures thereof.

4. The method of claim 1, wherein said aqueous solution additionally comprises an acid.

5. The method of claim 4, wherein said acid is selected from the group consisting of phosphoric acid, boric acid, sulfuric acid and mixtures thereof.

6. The method of claim 5, wherein said acid is present in an amount from 0.1 mol-% to 25 mol-% of said aqueous solution.

7. The method of claim 1, wherein said aqueous solution additionally comprises an adjuvant selected from the group consisting of a corrosion inhibitor and an antifoaming agent or mixtures thereof.

8. The method of claim 1, wherein an equal mass ratio mixture of the amine and physical solvent displays a dielectric constant of at least 25 at 25° C.;
wherein the pKa of said amine is at least 9.0 at 25° C.; and
wherein the normal boiling point of said amine is at least 200° C.

9. The method of claim 1, wherein said amine has a pKa of 9.0 to 11.0 at 25° C.

10. The method of claim 1, wherein said physical solvent displays a dielectric constant between 30 to 65 at 25° C.

11. A method of treating oil and gas streams comprising hydrogen sulfide ($H_2S$) and other acid gases, said method comprising:
treating said oil and gas streams with an aqueous solution, said aqueous solution consisting essentially of:
about 15 wt % to about 60 wt % of an amine selected from the group consisting of 3-diethylamino-1, 2-propanediol (DEAPD); 3-dimethylamino-1, 2-propanediol (DMAPD), 2-hydroxymethyl-2-dimethylaminopropane-1,3-diol (DMTA), 2-hydroxymethyl-2-diethylaminopropane-1,3-diol (DETA), 2-hydroxymethyl-2-methylaminopropane-1,3-diol (MTA); 2-ethylamino-2-hydroxymethyl-1,3-propanediol (ETA); and mixtures thereof;
about 2 wt % to about 60 wt % water;
up to 1 wt % an adjuvant selected from the group consisting of a corrosion inhibitor and an antifoaming agent or mixtures thereof;
up to 1 wt % acid; and
about 5 wt % to about 60 wt % physical solvent;
wherein said aqueous solution selectively removes said $H_2S$ over said other acid gases.

12. The method of claim 11 wherein said physical solvent is selected from the group of glycerol, ethylene glycol, sulfolane, N-methylpyrrolidone, N-formylmorpholine, propylene carbonate, ethylene carbonate and mixtures thereof.

13. The method of claim 11, wherein said acid is selected from the group of phosphoric acid, boric acid, sulfuric acid and mixtures thereof.

14. The method of claim 13, wherein said acid is present in an amount from 0.1 mol-% to 25 mol-% of said aqueous solution.

* * * * *